United States Patent [19]

Bender

[11] Patent Number: 4,953,447
[45] Date of Patent: Sep. 4, 1990

[54] VACUUM SUPPLY SYSTEM IN A MOTOR VEHICLE

[75] Inventor: Franz Bender, Wendlingen, Fed. Rep. of Germany

[73] Assignee: Daimler-Benz AG, Stuttgart, Fed. Rep. of Germany

[21] Appl. No.: 317,915

[22] Filed: Mar. 1, 1989

[30] Foreign Application Priority Data

Mar. 3, 1988 [DE] Fed. Rep. of Germany ....... 3806916

[51] Int. Cl.$^5$ .................... F15B 11/00; F15B 13/00
[52] U.S. Cl. ...................................... 91/514; 137/510; 137/907; 303/12; 91/516; 91/532; 91/443; 60/397; 60/412
[58] Field of Search ............... 180/244; 303/12, 4; 91/514, 516, 532, 443; 60/397, 407, 412; 137/907, 510, 513.3

[56] References Cited

U.S. PATENT DOCUMENTS

| | | | |
|---|---|---|---|
| 2,601,757 | 7/1952 | Horton | 60/397 |
| 2,732,685 | 1/1956 | Dishei | 303/12 |
| 2,998,256 | 8/1961 | Lipkins | 137/510 |
| 3,606,871 | 9/1981 | Gropp et al. | 137/513.7 X |
| 4,129,622 | 12/1978 | Tamazawa et al. | 137/513.3 X |
| 4,303,095 | 12/1981 | Aubel et al. | 137/907 X |
| 4,310,016 | 1/1982 | Aubel | 137/907 X |
| 4,373,499 | 2/1983 | Bendig | 137/110 X |
| 4,391,294 | 7/1983 | Aubel | 137/510 X |
| 4,485,904 | 12/1984 | Udono et al. | 137/513.7 X |
| 4,531,624 | 7/1985 | Ideta | 60/397 X |
| 4,554,786 | 11/1985 | Takeuchi et al. | 60/397 |
| 4,592,385 | 6/1986 | Semon | 137/510 X |
| 4,617,953 | 10/1986 | Kendall-Tobias | 137/110 |

FOREIGN PATENT DOCUMENTS

| | | |
|---|---|---|
| 1120293 | 12/1961 | Fed. Rep. of Germany . |
| 2814384 | 10/1979 | Fed. Rep. of Germany . |
| 3011360 | 10/1981 | Fed. Rep. of Germany . |
| 3124153 | 3/1982 | Fed. Rep. of Germany . |
| 3105041 | 9/1982 | Fed. Rep. of Germany . |
| 3243984 | 6/1983 | Fed. Rep. of Germany . |
| 3526763 | 2/1987 | Fed. Rep. of Germany . |

Primary Examiner—Edward K. Look
Assistant Examiner—John E. Ryznic
Attorney, Agent, or Firm—Evenson, Wands, Edwards, Lenahan & McKeown

[57] ABSTRACT

A vacuum supply system for a brake power assist unit of a motor vehicle and at least one additional vacuum consuming device, is achieved by a parallel arrangement of two pipes leading from a vacuum generating device one to the brake power assist unit and one to the additional consuming device. Both pipes are equipped with flow control devices one of which is blockable by means of a check valve with an increased restoring or closing force for securing a vacuum supply priority for the brake power assist unit.

20 Claims, 2 Drawing Sheets

VACUUM SUPPLY SYSTEM IN A MOTOR VEHICLE

BACKGROUND AND SUMMARY OF THE INVENTION

The invention relates to a vacuum supply system for a brake power assist unit of a vehicle, as well as for at least one additional consuming device, and having a vacuum generating device connected to a main pipe being provided with a first check valve between a suction connection of the vacuum generating device and the brake power assist unit. A branch pipe branches off from the main pipe between the suction connection and the first check valve and leads to the additional consuming devices. A second check valve in the branch pipe lets through a suction flow from the additional consuming device to the vacuum generating device, and a flow control device, fluidly connected in series with the second check valve is also provided.

A vacuum supply system of this type is known from German Unexamined Patent Application No. DE-OS 31 24 153.

Check valves between vacuum generating devices and different consuming devices, or groups of consuming devices, are normally installed in the corresponding supply pipes in order to avoid incoming atmospheric air, due to leakages at individual consuming devices, which has a disadvantageous effect on the vacuum level at other consuming devices which are not leaking.

Flow control devices such as brake power assist units which are arranged in front of secondary or so-called vacuum-consuming comfort devices (e.g., headlight adjusting motors, air-conditioning system control motors, etc.) require vacuum supply priority, which is desirable for reasons of driving safety. With a secure priority system, such priority devices can be evacuated by the same vacuum generating device as the secondary vacuum consuming devices.

It is known to use vacuum pumps with two separate suction connections (German Unexamined Patent Application No. DE-OS 32 43 984), in which case the suction connection belonging to the secondary consuming devices is equipped with a flow control device.

The above-mentioned arrangement is in use in diesel engine equipped vehicles manufactured by Daimler-Benz Aktiengesellschaft, in which however, a check valve is arranged in the suction pipe leading from the brake power assist unit to the vacuum source in order to maintain the vacuum level at the brake power assist unit during an atmospheric pressure flow short circuit of the vacuum pump. Between the brake power assist unit and the check valve, a throttled secondary pipe branches off from the suction pipe leading to the brake power assist unit. This throttled secondary pipe is bled only for the zero adjustment of the injection pump control rod when the diesel engine is shut off. For safety reasons, it must be a single pipe.

The growing number of comfort enhancing vacuum consuming devices used in motor vehicles make it necessary to be able to continuously ensure their vacuum supply. This supply should be improved over known systems mainly in view of the requirement that the lowest vacuum level be available at the brake power assist unit only when the power brake is actually actuated.

It is therefore the object of the invention to develop a vacuum supply system of this type, such that when the power brake is not actuated, the vacuum supply of secondary consuming devices is improved.

According to the invention, this object is achieved by having the flow line connected to the vacuum consuming device have a bypass pipe with a second flow control device fluidly arranged in parallel to both the second check valve and the first flow control device, which is itself connected in series with the second check valve.

By a bridging provided by the bypass, the check valve flow control device unit connected between the vacuum generating device and the secondary consuming devices, ensures that overall flow resistance of the supply of the secondary consuming devices is reduced, despite the additional flow control devices, so that when the power brake is not actuated, practically the complete vacuum output is available for use by the secondary consuming devices.

A vacuum supply system for a brake power assist unit and at least one additional consuming device is known from German Unexamined Patent Application No. DE-OS 31 05 041. There, the branch pipe of the secondary consuming device contains a flow control device for securing the priority of the supply of the brake power assist unit as well as a check valve, which fluidly is switched in parallel with this flow control device. Although the throttled pipe section is called a "detour pipe", it actually, because of the provided orientation of the parallel check valve through which an evacuation of the secondary consuming device must not be possible, represents the only bleeding possibility of the secondary consuming device. The check valve permits only an additional evacuation of the brake power assist unit at the expense of the vacuum level at the secondary consuming device.

Because of the specified opposite objectives, the mentioned German Unexamined Patent Application No. DE-OS 31 05 041 can supply no reference with respect to the construction of the type of vacuum supply system which has the flow line connected to the vacuum consuming device equipped with a bypass pipe with a second flow control device fluidly arranged in parallel to both the second check valve and the first flow control device, which is itself connected in series with the second check valve.

It is advantageous if the bypass pipe is connected to its own suction connection at the vacuum generating device which is constructed as a vacuum pump having two separate suction connections. Further, the bypass pipe and the second flow control device can be arranged fluidly in parallel with this second check valve and the first flow control device and can be integrated in a common housing having two pipe connections to the branch pipe. Alternatively, the two check valves, the first flow control device and the junction of the branch pipe from the main pipe can be arranged in a common housing having three pipe connections.

It is desirable that the second check valve be prestressed into its shut position with a higher restoring force than the first check valve, as well as having the first flow control device be arranged between the second check valve and the additional consuming device.

For control purposes, the second check valve can be shut by an outside power source. The outside power source can be controlled by an electric switch which is coupled with an actuating arrangement of the brake power assist unit. This actuating element could be mechanical or an electric pressure switch acted upon by fluidic brake system pressure. Alternatively, the electric switch could be actuated by the stop light switch of the motor vehicle. The second check valve is shut when the absolute pressure in front of the first check valve is higher than approximately 0.4 bar.

The flow control device arranged in the bypass pipe can have its smallest clear cross-section be of a diameter of between 0.6 and 1.0 mm and preferably 0.8 mm. The vacuum compensating tank, which fluidly is assigned to the at least one consuming device is connected to the bypass pipe.

Special constructions of check valves combined with flow control devices are known in the vacuum supply systems of the above-mentioned types. However, in these, a flow control device becomes operative only when the check valve is opened against its restoring force. German Unexamined Patent Application No. DE-OS 28 14 384 describes a check valve having a flow control device which is integrated and fluidly is arranged in parallel.

By providing the check valve connected between the vacuum generating device and the consuming device(s) with a relatively strong return spring, it is ensured that the secondary consuming devices and the relatively wide flow control device, which is connected behind it (in parallel to the narrow bypass flow control device) will not be evacuated by means of this check valve before a required vacuum level is reached at the brake power assist unit. The priority of the supply of the brake power assist unit continues to be ensured, because as soon as its vacuum chamber is bled during braking operations, the (absolute) pressure in the suction pipe will rise, and the second check valve will close. A slight increase of the achievable (absolute) vacuum level as a result of the bypass pipe, while the consuming device output remains the same, can be accepted without any difficulties.

Another advantageous development for even more reliably ensuring the priority of the brake power assist unit from the vacuum supply system is achieved, if the second check valve, during each braking operation, can be power actuated by any of electrical, hydraulic or pneumatic means.

A check valve in a vacuum supply system for a brake power assist unit which can be power operated is known from German Patent No. DE-AS 11 20 293. In addition to being operated by pressure differences, it is also controlled by an electric switch coupled with the brake pedal. It is opened electromagnetically and connects the brake power assist unit with a vacuum compensating tank, in order to improve the vacuum level acting upon it.

According to another embodiment of the invention (shown in FIG. 4), a valve is arranged in a secondary pipe between the vacuum generating device and the at least one secondary consuming device and can be controlled as a function of the instantaneously existing vacuum and can be switched into at least two positions.

The secondary pipe either starts out directly from the vacuum generating device, or from its own suction connection (dual-flow system); or leads only indirectly to the secondary consuming device (single-flow system); i.e., leading away as a branch pipe, in front of the check valve, from the main pipe leading to the brake power assist unit.

The overall throttling of the secondary consuming device suction flow is varied, in that in one position of the valve an additional flow control device can be connected in series with the already existing flow control device. In the other valve position, no additional throttling takes place. The valve switches over with a given vacuum value range, i.e., at approximately 0.5 bar. Above this range (in the direction of the atmospheric pressure), the suction flow is throttled more, in order to continue to evacuate the brake power assist unit as a priority. Below this range, the vacuum level existing in the system is sufficient for a reliable operation of the brake power assist unit, so that the throttling of the secondary consuming device suction flow may be reduced without any loss of reliability, and thus the supply of the secondary consuming devices may be improved.

With respect to their basic principles, valve arrangements which allow a variable throttling of flows are known. German Unexamined Patent Application No. DE-OS 30 11 360 shows a compressed air system for a vehicle, which has a 3/2-way valve, which pneumatically can be switched into two positions and to two corresponding pipe sections. In one position, this 3/2-way valve switches a freely passable pipe section into a compressed air pipe and in the other position, switches a pipe section equipped with a control device into a compressed air pipe. By this arrangement, the amount of air is reduced which must be released by a pressure regulator connected behind the valve since the system pressure behind the valve, or in the pressure regulator, switches it, starting from a certain sufficient pressure level into a "throttling" position. In addition, from German Patent No. DE-PS 35 26 763, a similar arrangement of an electromagnetically switchable 3/2-way valve is known which, as a function of an electrically detected system pressure, switches either a throttled or an unthrottled pipe section between a bi-pressure pump and consuming devices. This arrangement has the purpose of making it possible to connect several consuming devices with different pressure level requirements to a single pressure source. However, neither of the latter texts supplies any reference to the endeavored improvement referenced in this invention.

Other objects, advantages and novel features of the present invention will become apparent from the following detailed description of the invention when considered in conjunction with the accompanying drawings.

DETAILED DESCRIPTION OF THE DRAWINGS

Figure 1:
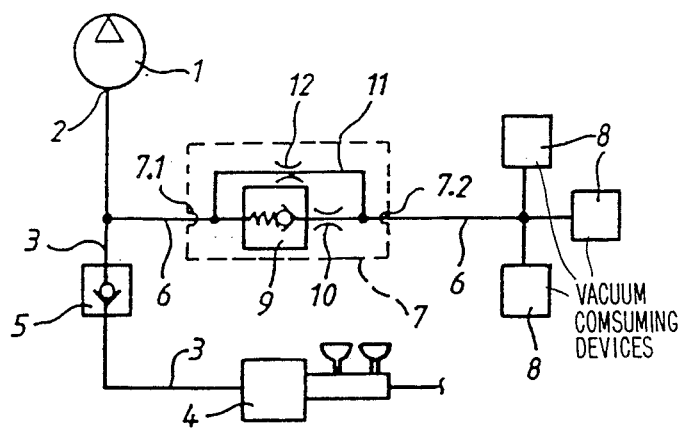
FIG. 1 is a vacuum supply system having a vacuum generating device, which has a single suction connection.

In a so-called single-flow vacuum supply system (FIG. 1), a vacuum generating device 1, such as a mechanically driven pump, has a single suction connection 2, to which a main pipe 3 is connected, which is also called a Master-Vac pipe, and which leads to a symbolically indicated vacuum brake power assist unit 4. A first check valve 5 is inserted into the main pipe 3 which only permits the evacuating of the brake power assist unit vacuum chamber and opens up when acted upon by the vacuum generating device 1 even by a low vacuum Viewed from the direction of the vacuum generating device 1, a branch pipe 6 leads into the main pipe 3 in front of the first check valve 5. This branch pipe 6 first leads to a first pipe connection 7.1 of a housing 7, and from a second pipe connection 7.2, to one or several schematically indicated additional vacuum consuming devices 8. These may be, for example, the flap adjusting elements of an air-conditioning system or headlight adjusting motors, which, when necessary, are acted upon by a vacuum by means of switchable valves, which are not shown.

In the housing 7, between the two pipe connections 7.1. and 7.2, are a second check valve 9 and a first flow control device 10, which are fluidly connected in series and a bypass pipe 11 with a second flow control device 12 in parallel to the second check valve 9 and to the first flow control device 10.

The second check valve 9 is held shut by means of a significantly higher restoring force (indicated by a symbol of a spring) than the first check valve 5. It does not open up before an absolute vacuum value of approximately 0.4 bar is reached on the suction side. Nevertheless, a constant, although limited, supply of the additional consuming devices 8 with the vacuum is ensured by the second flow control device 12 in the bypass pipe 11, which preferably is opened up by 0.8 mm with respect to its diameter.

Figure 2:
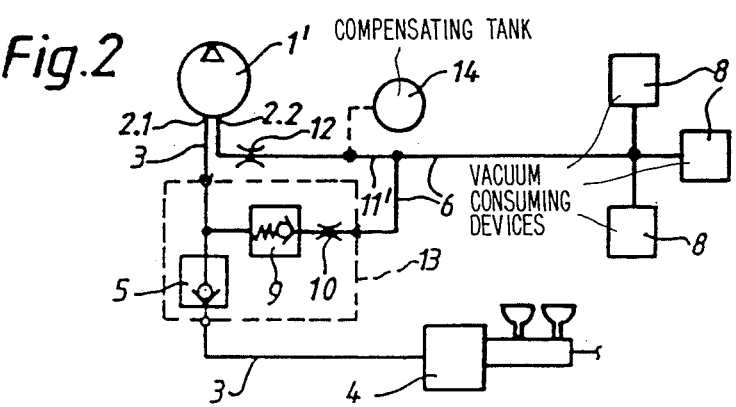
FIG. 2 is a system having a vacuum generating device, which has two suction connections.

FIG. 2 shows a so-called dual-flow system, in which a vacuum pump 1' is used, which has two separate suction connections 2.1 and 2.2. Again, the main pipe 3 is connected to the first suction connection 2.1, while a bypass pipe 11' having the second flow control device 12 is connected to the second suction connection 2.2.

The two check valves 5, 9, the first flow control device 10 and the junction of the branch pipe 6 and the main pipe 3, in the embodiment according to FIG. 2, are installed in a common housing 13. Toward the outside, this housing 13 has two connections for the main pipe 3 and one connection for the branch pipe 6. The provided arrangement reduces leakage risks resulting from defective pipe connections at check valves or branchings, as at the housing 7 in FIG. 1.

The bypass pipe 11' and the branch pipe 6 are guided together outside the housing 13 in front of the consuming devices 8, in which case a vacuum pressure compensating tank 14 may also be connected to the bypass pipe 11'.

Figure 3:
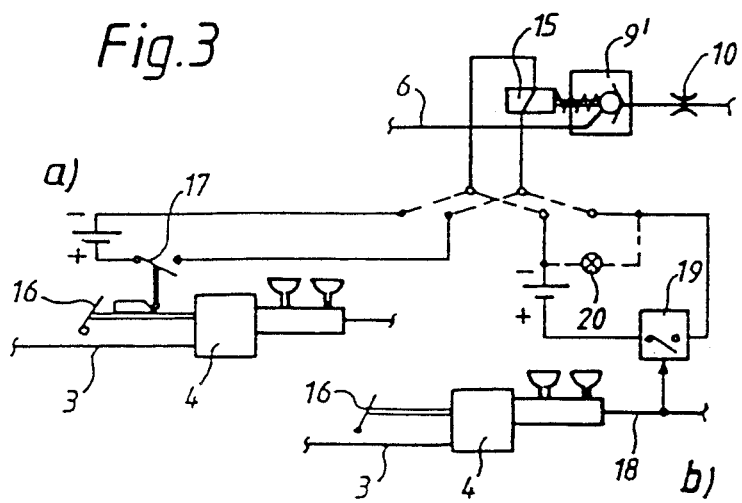
FIGS. 3a and 3b are variants for the control of the external power for shutting the second check valve.

FIGS. 3a and 3b finally show two variants for the shutting of a second check valve 9' by means of an outside power, when the power brake is actuated. In both cases, it must be possible to shut the check valve 9' electromagnetically by means of the indicated winding 15. In FIG. 3a, a mechanically closable switch 17, which is coupled with a brake pedal 16, is used as the trigger for the electromagnetically caused shutting movement. In FIG. 3b, an alternative switch 19 is shown, which can be actuated by pressure and is arranged in the hydraulic or pneumatic brake pipe system 18 of the motor vehicle.

The triggering function for the valve shutting movement may advantageously be assigned as an additional function of the normal vehicle stop light switch, which is part of any motor vehicle. This is shown by a lamp 20, (FIG. 3b) and is connected in parallel to the pressure switch 19.

Figure 4:
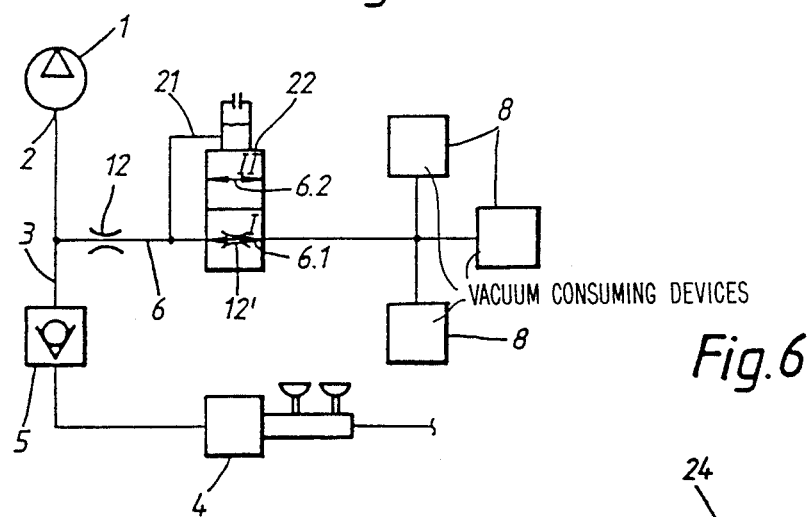
FIG. 4 is another embodiment having a valve, which switches over pneumatically as a function of the vacuum existing in the vacuum supply system; this valve in one position, permitting the passage of a throttled suction flow and, in another position, permitting the passage of an unthrottled suction flow.

FIG. 4 shows another possibility which requires neither a continuously open bypass pipe nor a check valve in the secondary consuming device branch. In principle, this solution is again suitable for a single-flow system as well as for a dual-flow system, but is shown only for the former. For this reason, the "secondary pipe" here is a branch pipe of the main pipe. The branch pipe 6 now contains, between the already existing flow control device 12 and the secondary consuming devices 8, a parallel arrangement of a section 6.1, that is provided with an additional flow control device 12', and of a freely passable section 6.2. A valve 22, which can be switched pneumatically by means of a control connection 21, switches a connection between the vacuum generating device 1 and the secondary consuming devices 8 either by means of section 6.1 (Position I) or by means of Section 6.2 (Position II). The control connection 21 is also connected to the branch pipe 6 behind the flow control device 12. The pneumatic drive of the valve 22 is adjusted such that it holds the valve 22, in the case of a vacuum between 1 and approximately 0.5 bar in the branch pipe 6, in its position I, in which, because of the adding up of two flow control resistances 12 and 12', only a very significantly throttled suction flow is possible, and switches it to its position II, below a vacuum of approximately 0.5 bar, in which no significant additional throttling effect over that of resistance 12 exists. The setting of the switching threshold of the valve 22 may take place, for example, by a spring prestressing of the valve, which is variable in a known manner, by a fixed installation of springs having different characteristic curves, according to the requirements, or by other measures.

A type of construction of the integration of sections 6.1 and 6.2 into the valve 22, which is shown here symbolically, will be described in FIG. 6.

Naturally, in the arrangement according to FIG. 4, an electromagnetically switchable valve may replace the shown pneumatically switchable valve 22. This equivalent valve would then be controlled by means of a pressure switch, which would replace the branch pipe, to which the valve control connection 21 is connected in FIG. 4.

With both arrangements, the vacuum supply of the brake power assist unit will then have high priority precisely when the vacuum level in the system is not as low as required in the normal operation. This happens particularly when the motor vehicle is to be started after it has been switched off for a long time, or when the power brake is used intensively, for example, during so-called "cadence braking".

Figure 5:
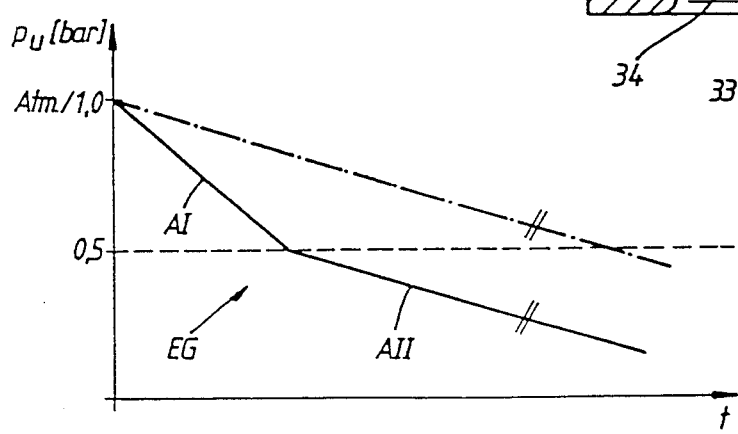
FIG. 5 is a diagram, which shows the effect of the switchable valve on the pressure reduction at the brake power assist unit entered over a timing axis.

The graph of FIG. 5 shows a line EG (evacuating speed), which starts from the atmospheric pressure level (1.0 bar) and which qualitatively represents the pressure course $p_u$ at the brake power assist unit over time t. It shows the effect of the flow control device 12', which can be connected by means of the valve 22. Line EG is composed of two differently steep segments AI and AII, which continuously merge with one another at a bending point. The bending point marks the switching point of the valve 22, which, in this case, is situated at the preferable value of 0.5 bar. A steeper ascent (AI) and thus a higher evacuating speed at the brake power assist unit 4 occurs when the valve is in position I (i.e., when flow control device 12' is effectively connected in series with flow control device 12, and their resistances are added up). In position II of the valve (when flow control device 12' is inoperative), the evacuating speed of the brake power assist unit 4 is lower, which means that the suction performance of the vacuum generating device 1 at the secondary consuming devices 8 is better. However, as soon as a pressure rise exists in the system, which exceeds the switching point of valve 22, the flow control device 12' is switched back to be operative, since the valve 22 returns to its (inoperative) position I and the suction performance of the vacuum generating device 1 at the brake power assist unit 4 is increased correspondingly.

Since the vacuum in the normal operation is clearly below 0.5 bar, switching processes of the valve 22 are expected only when the power brake is operated with unusual intensity.

A dash-dotted line with the same ascent as segment AII of Line EG indicates that the desirable vacuum level at the brake power assist unit, without flow control device 12', which can also be switched, would be reached significantly later while the supply of the secondary consuming devices is approximately equally good.

Figure 6:
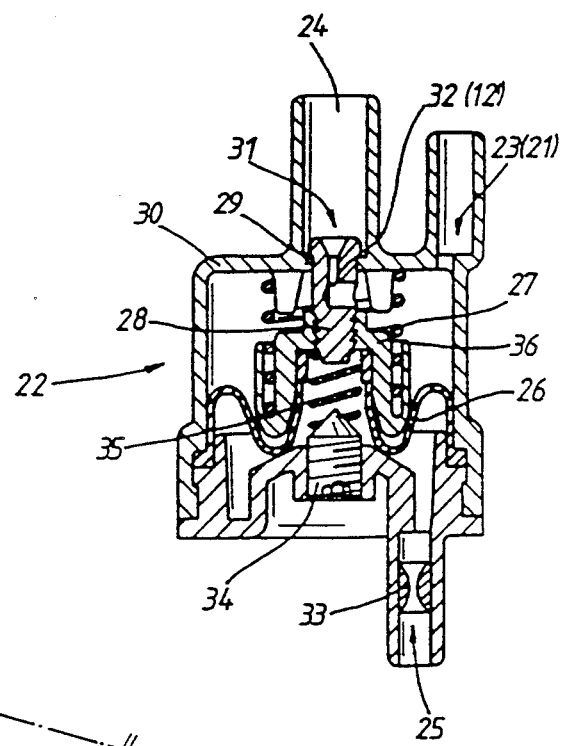
FIG. 6 is an embodiment of a pneumatically switchable valve, which can be used advantageously in the vacuum supply system according to FIG. 4.

FIG. 6 finally is a sectional view of an embodiment of a pneumatically switchable valve 22. Valve 22 has a suction connection path 23, a consuming device connecting path 24 and an atmosphere connecting path 25. The latter is permanently separated from the two other paths of the valve 22 by means of an elastic diaphragm 26. The diaphragm 26 is prestressed to a position I by a prestressing spring 27 and has both its sides exposed to a pressure difference. The diaphragm 26 is firmly connected with a valve body 28, which cooperates with valve seat 29 of the valve chamber 30. In position I, the valve body 28 is located on the valve seat 29. A connection will then exist between the suction connection path 23 and the consuming device connecting path 24 only through a center bore 31 in the valve body 28, which has a restricted narrow point 32, acting as the flow control device 12'. When the differential pressure at the diaphragm 26, resulting from atmospheric pressure at connecting path 25 and vacuum at connecting path 23, outbalances the prestressing force of the spring 27, (i.e., the system vacuum has reached the required level), the diaphragm 26 in the housing 30 is shifted in the direction of the consuming device connecting path 24 and lifts the valve body 28 off its seat 29. As a result, an annular-gap-shaped flow cross-section is exposed which is significantly larger than the restricted narrow point 32 in the valve body. The suction connection path 23 in addition therefore takes over the function of the control input 21, which is shown in FIG. 4.

In addition, a flow control point 33 is provided in the atmosphere connecting path 25, which is used only as a simple additional safety device against an unhindered penetration of atmospheric pressure into the vacuum system in the case of possibly occurring defects or leakages of the diaphragm 26.

The switching threshold of the valve 22 can be adjusted to desired values in a simple manner by an adjusting screw 34 in the valve chamber 30. The adjusting screw sets the bias of an inserted spring 35 in a supporting body 36 of the diaphragm, which firmly connects the valve body 28 with the diaphragm 26.

Although the present invention has been described and illustrated in detail, it is to be clearly understood that the same is by way of illustration and example only, and is not to be taken by way of limitation. The spirit and scope of the present invention are to be limited only by the terms of the appended claims.

WHAT IS CLAIMED:

1. A vacuum supply system for a brake power assist unit in a motor vehicle, as well as for at least one additional vacuum consuming device comprising:
   a main pipe being provided between a suction connection of a vacuum generating device and the brake power assist unit and having a first check valve therein;
   a branch pipe branching off from the main pipe to the at least one additional consuming device and which is connected between the suction connection and the first check valve and contains a second check valve therein;
   the second check valve permits a suction flow from the at least one additional consuming device to the vacuum generating device;
   a first flow control device fluidly connected in series with the second check valve;
   a bypass pipe having a second flow control device fluidly connected in parallel to the second check valve and the first flow control device.

2. A vacuum supply system according to claim 1, wherein the bypass pipe has a separate suction connection to the vacuum generating device; and wherein the vacuum generating device is constructed as a vacuum pump having two separate suction connections.

3. A vacuum supply system according to claim 1, wherein the bypass pipe and the second flow control device, the second check valve and the first flow control device are integrated in a common housing having two pipe connections with the branch pipe.

4. A vacuum supply system according to claim 1, wherein the second check valve is prestressed into its shut position with a higher restoring force than the first check valve.

5. A vacuum supply system according to claim 1, wherein the second check valve can be shut by outside power.

6. A vacuum supply system according to claim 1, wherein the second flow control device has its smallest clear cross-section with a diameter of between 0.6 and 1.0 mm.

7. A vacuum supply system according to claim 1, wherein a vacuum compensating tank is fluidly assigned to the at least one consuming device and wherein the vacuum compensating tank is connected to the bypass pipe.

8. A vacuum supply system according to claim 2, wherein the two check valves, the first flow control device and the junction of the branch pipe from the main pipe are arranged in a common housing having three pipe connections.

9. A vacuum supply system according to claim 2, wherein the second check valve is prestressed into its shut position with a higher restoring force than the first check valve.

10. A vacuum supply system according to claim 3, wherein the second check valve is prestressed into its shut position with a higher restoring force than the first check valve.

11. A vacuum supply system according to claim 4, wherein the first flow control device is fluidly arranged between the second check valve and the additional consuming device.

12. A vacuum supply system according to claim 4, wherein the second check valve can be shut by outside power.

13. A vacuum supply system according to claim 5, wherein the outside power for shutting the second check valve can be controlled by an electric switch coupled to an actuating arrangement of the brake power assist unit.

14. A vacuum supply system according to claim 5, wherein the outside power for shutting the second check valve can be controlled by an electric pressure switch acted upon by brake system pressure.

15. A vacuum supply system according to claim 4, wherein the second check valve is shut when the absolute vacuum in front of the first check valve is higher than approximately 0.4 bar.

16. A vacuum supply system according to claim 8, wherein the second check valve is prestressed into its shut position with a higher restoring force than the first check valve.

17. A vacuum supply system according to claim 9, wherein the first flow control device is fluidly arranged between the second check valve and the additional consuming device.

18. A vacuum supply system according to claim 10, wherein the first flow control device is fluidly arranged between the second check valve and the additional consuming device.

19. A vacuum supply system according to claim 13, wherein the electric switch is controlled by a vehicle stop light switch of the motor vehicle.

20. A vacuum supply system according to claim 16, wherein the first flow control device is fluidly arranged between the second check valve and the additional consuming device.

* * * * *